United States Patent [19]

Porter et al.

[11] Patent Number: 4,471,609
[45] Date of Patent: Sep. 18, 1984

[54] APPARATUS AND METHOD FOR MINIMIZING ENGINE BACKBONE BENDING

[75] Inventors: Kenneth W. Porter, Mercer Island; Douglas McLaren, Seattle, both of Wash.

[73] Assignee: The Boeing Company, Seattle, Wash.

[21] Appl. No.: 410,526

[22] Filed: Aug. 23, 1982

[51] Int. Cl.³ .................................................. F02C 7/20
[52] U.S. Cl. ............................................ 60/39.31; 244/129 A
[58] Field of Search ............... 60/39.31, 39.32, 39.83; 415/178, 219 R; 244/53 R, 54, 117 A, 129 A

[56] References Cited

U.S. PATENT DOCUMENTS

| | | | |
|---|---|---|---|
| 1,522,032 | 1/1925 | Scarff . | |
| 1,635,938 | 7/1927 | Hudson . | |
| 2,264,765 | 12/1941 | LeVeque | 181/51 |
| 2,625,007 | 1/1953 | Truax | 60/35.6 |
| 2,794,319 | 6/1957 | Stockdale | 60/35.6 |
| 2,935,841 | 5/1960 | Myers et al. | 60/35.6 |
| 3,013,641 | 12/1961 | Compton | 244/117 A |
| 3,126,718 | 3/1964 | Flamand | 244/117 A |
| 3,190,070 | 6/1965 | Neu, Jr. | 60/35.6 |
| 3,353,359 | 11/1967 | Webb | 60/265 |
| 3,566,606 | 3/1971 | Mortlock | 60/226 |
| 3,815,360 | 6/1974 | Wellintz | 60/264 |
| 3,848,697 | 11/1974 | Jannot et al. | 181/33 HB |
| 3,910,039 | 10/1975 | Fortini | 60/265 |
| 3,952,823 | 4/1976 | Hinderks | 180/64 |
| 3,970,252 | 7/1976 | Smale et al. | 239/127.3 |
| 3,981,448 | 9/1976 | Demogenes et al. | 239/127.3 |
| 3,981,449 | 9/1976 | Krey et al. | 239/127.3 |
| 4,044,555 | 8/1977 | McLoughlin et al. | 60/264 |
| 4,044,973 | 8/1977 | Moorehead | 60/39.31 |
| 4,081,137 | 3/1978 | Sutton et al. | 239/127.3 |
| 4,214,441 | 7/1980 | Mouritsen et al. | 60/262 |
| 4,265,332 | 5/1981 | Presnall et al. | 181/211 |

Primary Examiner—Louis J. Casaregola
Attorney, Agent, or Firm—John H. Pauly; Delbert J. Barnard

[57] ABSTRACT

In an aircraft, a jet engine is carried by a frame (4), and the engine core casing (18B) acts as a beam. An engine core cowl (30) is made of a composite material that maintains structural strength within a given temperature range. The outer surface of the cowl (30) is cooled by the ambient airstream. The sidewall (32) of the cowl (30) is stiffened by a plurality of beams on its inner surface, preferably including axial beams (34) and circumferential beams (38). The beams (34,38) are tubular and have interconnecting passageways (37,39). The cowl (30) is connected to and structurally integrated with the engine casing. Cooling air is aspirated through the passageways (37,39) to maintain the inner portions of the beams (34,38) at essentially the same temperature as the outer surface of the sidewall (32). The flow of cooling air is metered. The cowl (30) acts as a beam and shares bending loads with the engine-casing.

13 Claims, 12 Drawing Figures

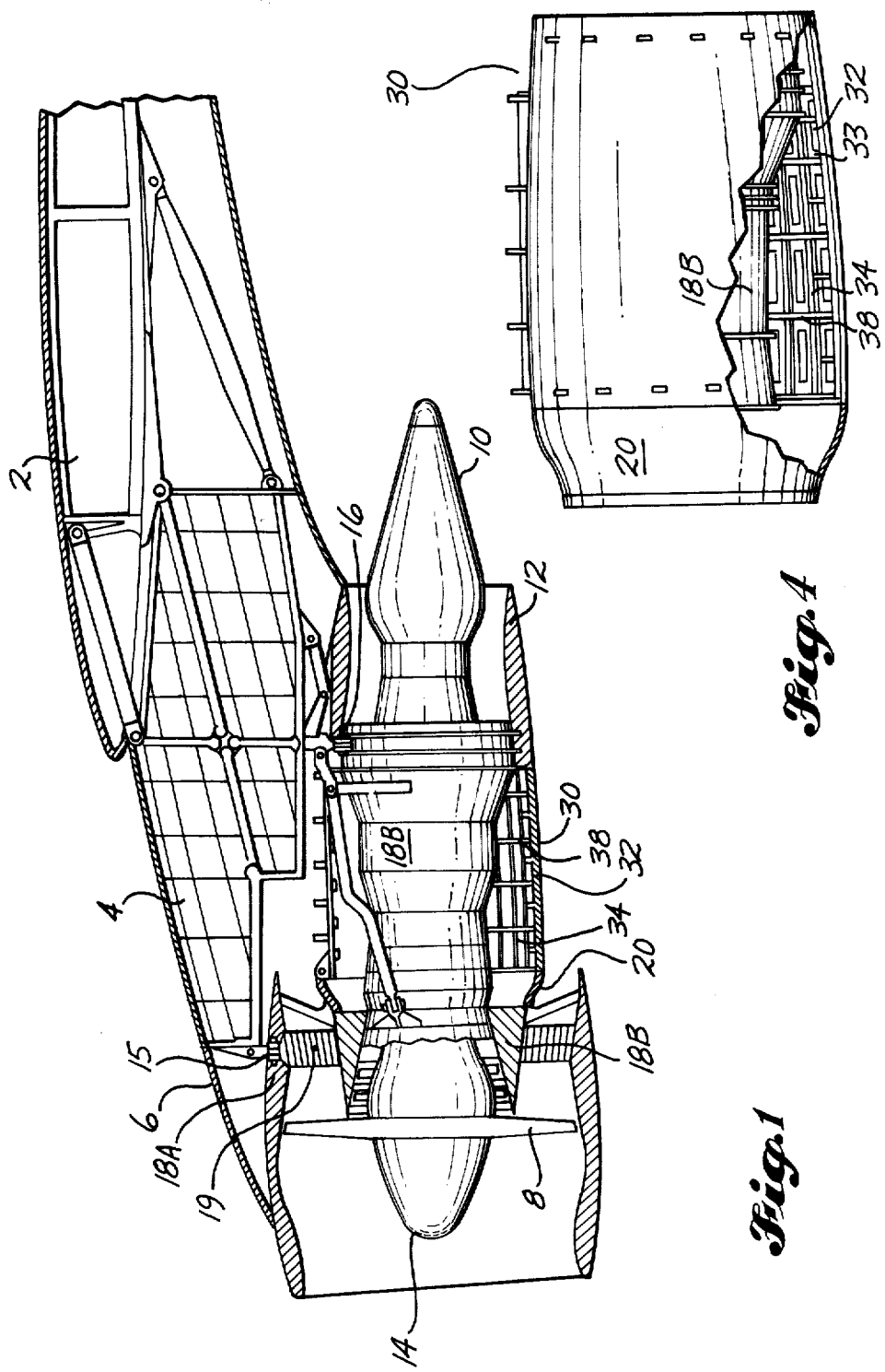

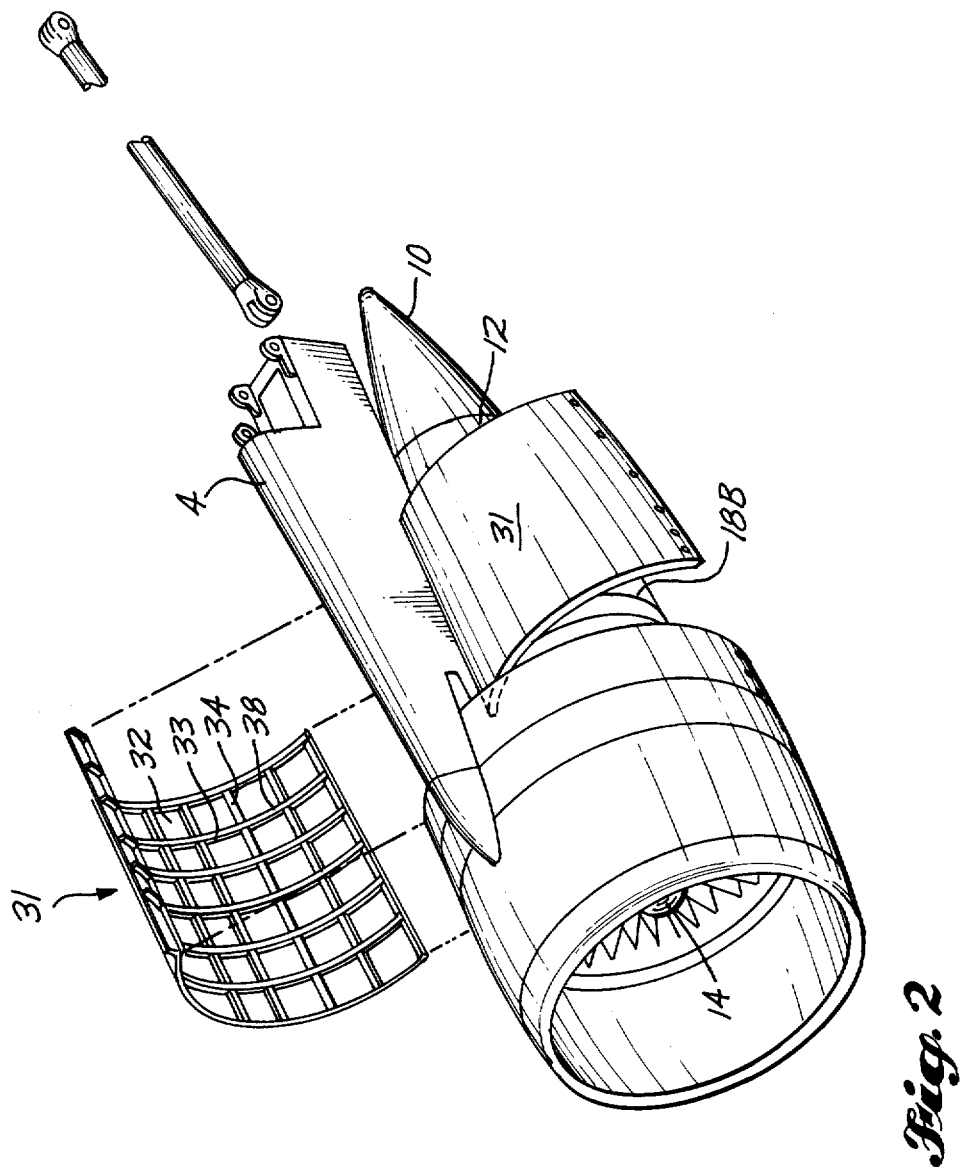

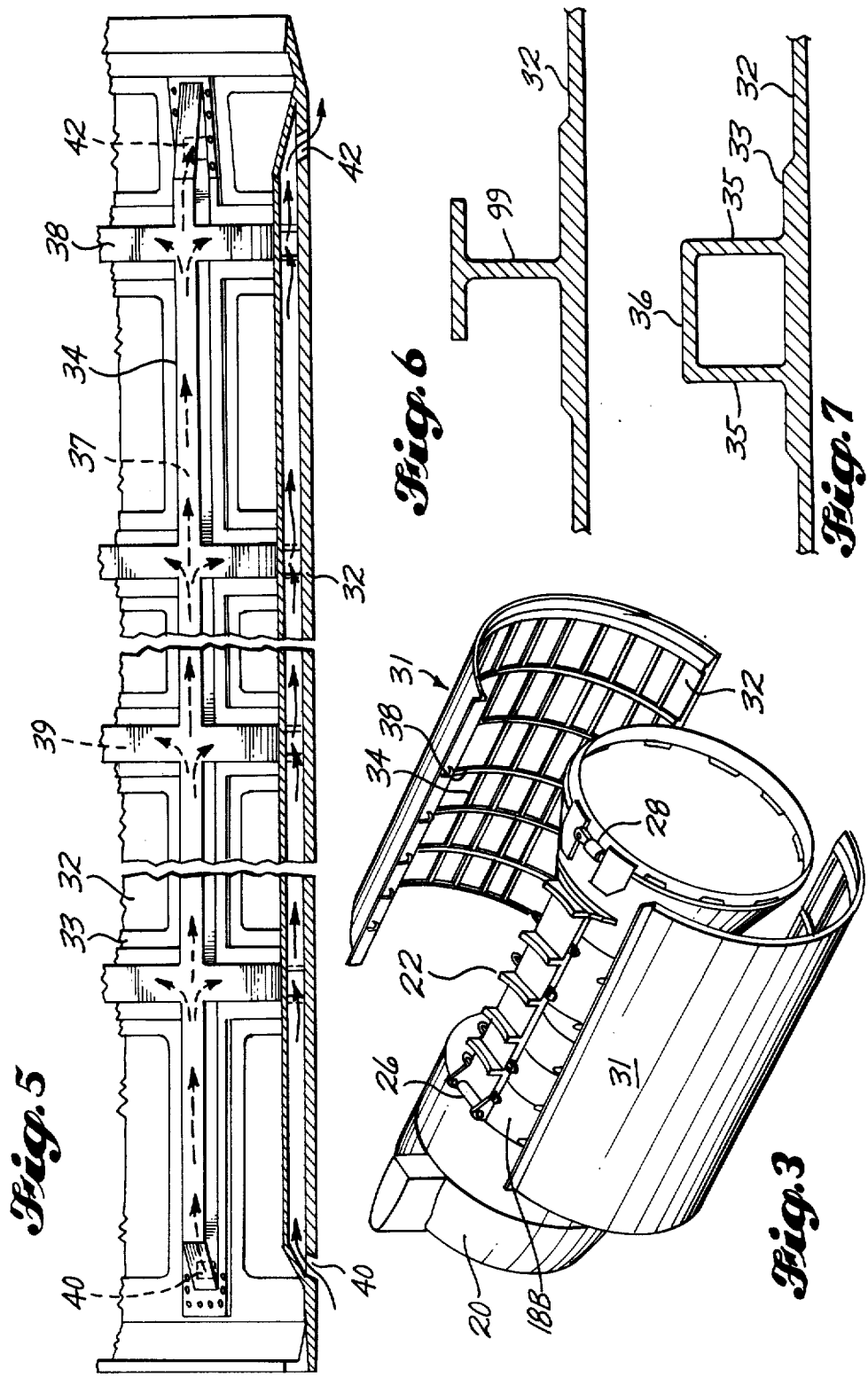

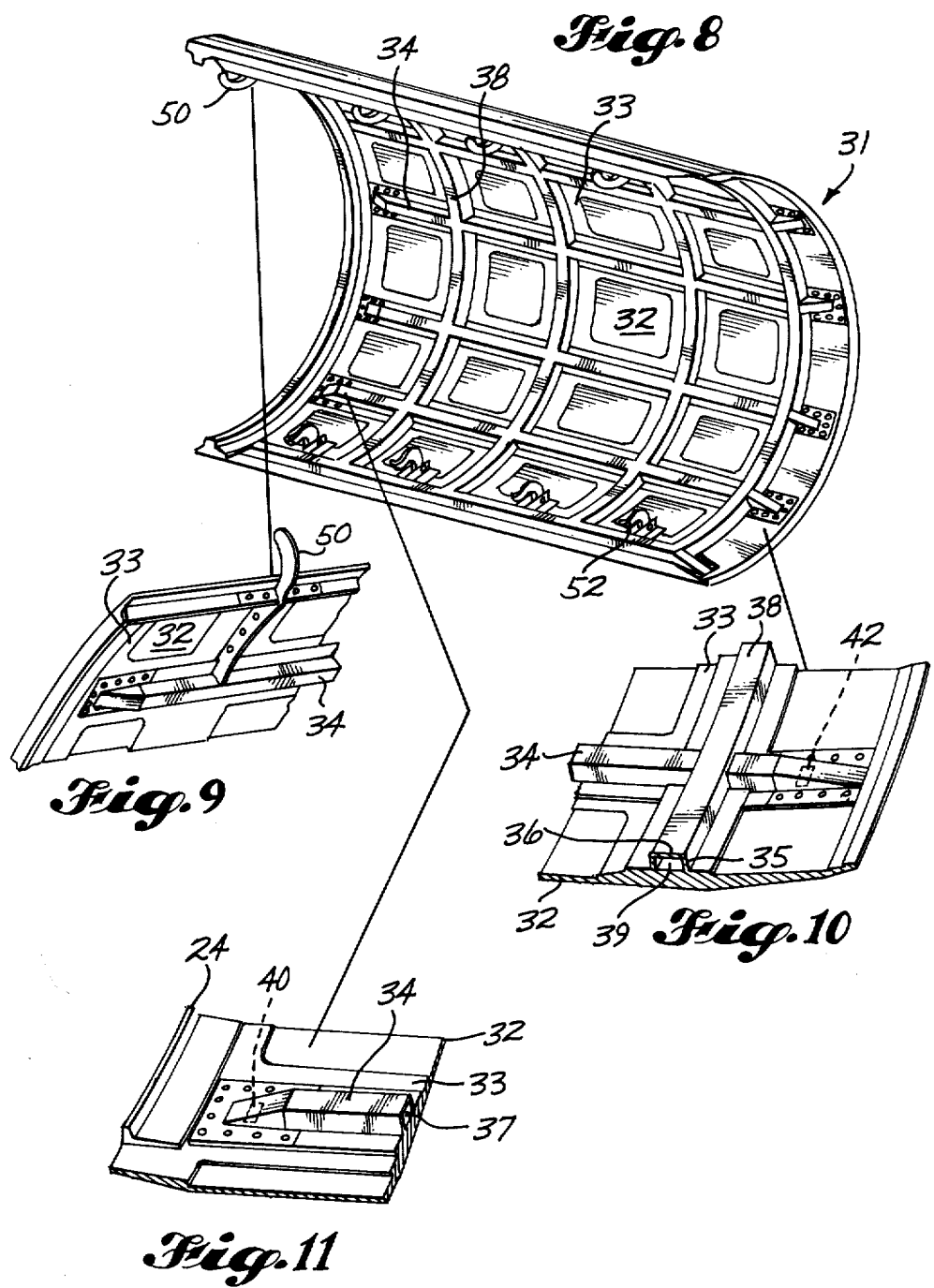

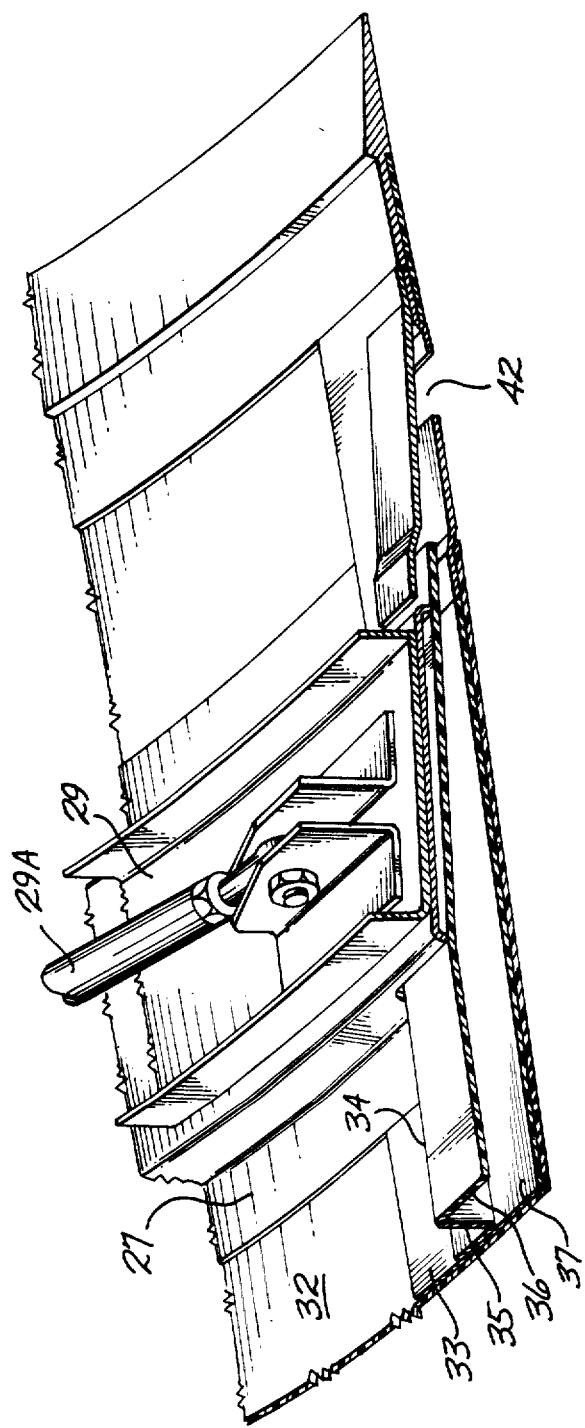

APPARATUS AND METHOD FOR MINIMIZING ENGINE BACKBONE BENDING

DESCRIPTION

1. Technical Field

This invention relates to aircraft engine core cowls and to methods of reducing engine backbone bending, and more particularly, to a composite material core cowl that is stiffened by air-cooled hollow beams and that is structurally integrated with the engine casing, and to a method in which the cowl acts as a beam and shares bending loads with the engine casing and in which the flow of cooling air in the beams is metered.

2. Background Art

In conventional jet aircraft, each engine is typically mounted on a frame carried by a wing, fuselage, or other aircraft structure, and the engine casing acts as both a beam and a column that carries the loads created by the thrust of the engine and the air load, which may be offset, acting on the mount locations. The core cowl is conventionally attached to the engine but is not structurally integrated with the engine, so that the engine casing bears the entire bending load. In the past, this arrangement has been satisfactory. However, with the development of new larger engines of lighter weight construction and larger aircraft, the bending loads have reached a magnitude sufficient to cause a substantial engine backbone bending problem.

The bending problem creates engine performance deterioration that causes the engine to burn extra fuel. The engine performance deterioration results because the beam formed by the engine casing does not have sufficient stiffness to prevent distortion of the engine casing during takeoff or in flight maneuvers. The distortion of the casing can cause rotor instability, and rapid wear of the tips of the compressor, turbine, and fan blades may result from casing deflections causing blade tip interference with the casing. Most of the wear on the engine is experienced on the first flight of a new or refurbished engine, and most of the first flight deterioration occurs at the moment of lift-off and aircraft rotation to the climb attitude. Repair only partially restores performance since the interference condition may persist.

The effect of the accumulated damage is the need for more shop visits for refurbishment, resulting in greatly increased cost of maintenance, and an overall loss of fuel efficiency. Such a loss of fuel efficiency, in these days of steadily increasing costs, is an unacceptable burden. Therefore, a principal object of the invention is to prevent this loss of fuel efficiency by structurally integrating the core cowl with the engine so that the core cowl will act as a durable structural member, the bending loads will be divided between the core cowl and the engine casing, and deflections will be reduced and blade tip rubbing prevented.

This load sharing concept has proved effective in dealing with the engine backbone bending problem. However, there is a certain amount of trade off involved. That is, structurally integrating a conventionally made core cowl with the engine casing adds to the overall weight of the aircraft. There is a net gain in fuel efficiency since the losses due to engine performance deterioration are greatly reduced, but the improvement in fuel efficiency is far from maximized. Therefore, it is another principal object of the present invention to provide a lightweight core cowl that shares bending loads with the engine casing. An aircraft equipped with such load carrying core cowls made of lightweight composite materials may actually weigh less than a conventionally manufactured airplane.

The use of composite materials in engine nacelles presents problems because these materials, although not subject to destruction from very high temperatures, lose some of their ability to carry loads as their temperature rises. Hence, there is a need to ensure that in service the temperature of each load-bearing portion of the cowl will not exceed the temperature at which the decrease in load-carrying ability becomes significant.

The following is a list of United States patents that disclose apparatus and/or methods for cooling parts of structures:

No. 1,522,032, granted Jan. 6, 1925, to W. L. Scarff;
No. 1,635,938, granted July 12, 1927, to J. W. Hudson;
No. 2,264,765, granted Dec. 2, 1941, to H. E. Le Vegue;
No. 2,625,007, granted Jan. 13, 1953, to R. C. Truax;
No. 2,794,319, granted June 4, 1957, to C. H. Stockdale;
No. 2,935,841, granted May 10, 1960, to H. S. Myers et al;
No. 3,190,070, granted June 22, 1965, to E. A. Neu, Jr.;
No. 3,353,359, granted Nov. 21, 1967, to J. E. Webb;
No. 3,815,360, granted June 11, 1974, to J. N. Wellinitz;
No. 3,848,697, granted Nov. 19, 1974, to Jannot et al;
No. 3,910,039, granted Oct. 7, 1975, to A. Fortini;
No. 3,970,252, granted July 20, 1976, to Smale et al;
No. 3,981,448, granted Sept. 21, 1976, to Demogenes et al;
No. 3,981,449, granted Sept. 21, 1976, to Krey et al;
No. 4,044,555, granted Aug. 30, 1977, to McLoughlin et al;
No. 4,081,137, granted Mar. 28, 1978, to Sutton et al;
No. 4,214,441, granted July 29, 1980, to Mouritsen et al; and
No. 4,265,332, granted May 5, 1981, to Presnall et al.

The first thre of these patents, Scarff, Hudson, and Le Veque, disclose separate structural members that use air flow to create suction to draw gases from the structural member to be cooled. With the exception of Myers et al, the remainder of the above patents disclose double-walled structures that function to cool the wall itself or the chamber enclosed by the wall. Myers et al discloses a wall of a thrust chamber that has axial holes extending through it for cooling the inner surface of the wall. The wall is made from a highly heat conductive material. Stockdale, Myers et al, Neu, Jr., Webb, Jannot et al, Fortini, Krey et al, McLoughlin et al, and Sutton et al disclose apparatus in which cooling air is directed through longitudinal passageways in the walls of the chamber to be cooled.

Two other United States patents are of possible relevance in considering the present invention. No. 3,566,606, granted Mar. 2, 1971, to J. O. Mortlock, discloses a double-walled structure enclosing side by side longitudinal tubes through which hot gases are directed for deicing or defrosting of an airplane engine casing. No. 3,952,823, granted Apr. 27, 1976, to Hinderks, discloses apparatus for extracting gases from a vehicle. This apparatus uses air flow to create suction to extract the gases in a manner similar to the functioning of the devices disclosed by Scarff, Hudson, and Le Veque.

The above-cited patents, together with the prior art that was cited and considered by the Patent Office before granting them, as listed on such patents, should be carefully considered for the purpose of properly evaluating the subject invention and putting it into proper perspective relative to the prior art.

DISCLOSURE OF THE INVENTION

This invention relates to an improvement to be used in combination with an aircraft in which an engine is carried by an engine mounting frame and the engine casing acts as a beam. According to a basic aspect of the invention, the improvement comprises a core cowl that surrounds a portion of the engine. This cowl comprises a material that can withstand heat but that loses strength as its temperature rises above a predetermined level. The cowl includes a sidewall and stiffening means for stiffening the cowl. The outer surface of the sidewall is positioned to be exposed to a cooling airstream. The stiffening means includes a plurality of tubular beams on the inner surface of the sidewall of the cowl. Each of the beams has a wall portion that is spaced from the inner surface of the sidewall. The improvement also includes connecting means for connecting the cowl to the engine mounting frame and for structurally integrating the engine casing with the cowl. Means for directing cooling air through the beams is also provided. The cowl acts as a beam and shares bending loads with the engine casing.

According to another aspect of the invention, the tubular beams include first and second sets of non-intersecting beams, each such set being spaced about the inner surface of the sidewall of the cowl. The first set intersects the second set, and the two sets are interconnected to allow the passage of cooling air between them.

According to still another aspect of the invention, the tubular beams extend axially along and are distributed circumferentially about the inner surface of the cowl sidewall.

According to a preferred aspect of the invention, the axial beams are spaced circumferentially about the inner surface of the sidewall of the cowl. The stiffening means further includes a plurality of axially-spaced tubular beams extending circumferentially around the inner surface of the sidewall. Each of these circumferential beams has a wall portion that is spaced from the inner surface of the sidewall. The axial beams and the circumferential beams are interconnected to allow the passage of cooling air between them.

According to another aspect of the invention, said wall portion of each tubular beam is essentially parallel to the inner surface of the sidewall of the cowl.

According to a preferred aspect of the invention, the tubular beams are hollow box means.

According to another preferred aspect of the invention, the means for directing cooling air comprises inlet means at the forward end of the cowl and outlet means at the rear end of the cowl. The inlet means and the outlet means are positioned to maintain flow of cooling air by forced aspiration.

According to still another preferred aspect of the invention, the cowl comprises laminated panels of composite material. The tubular beams are formed integrally with the sidewall of the cowl.

According to a method aspect of the invention, a method of minimizing engine backbone bending is provided in a system in which an engine is carried by an engine mounting frame of an aircraft, a core cowl surrounds a portion of the engine, the outer surface of the sidewall of the cowl is exposed to a cooling airstream, and the engine casing acts as a beam that carries bending loads. The method comprises providing the core cowl with tubular beams on the inner surface of the sidewall of the cowl to stiffen the cowl. The cowl and engine casing are connected together and structurally integrated. This allows the cowl to act as a beam so that the cowl and the engine casing each experience bending loads. A metered flow of cooling air is directed through the tubular beams to maintain the radially inner portions of the beams at essentially the same temperature as the outer surface of the sidewall of the cowl. Preferably, the step of directing a metered flow of cooling air comprises selecting tubular beams with longitudinal passageways that are sized to permit the desired amount of flow, and positioning inlet means at the forward end of the cowl and outlet means at the rear end of the cowl to maintain flow of cooling air by forced aspiration.

The apparatus and method of this invention to a large degree eliminate engine backbone bending and its attendant problems. The bending loads are divided between the load carrying core cowl and the engine casing. By providing core cowls that are structurally reinforced and air cooled, the invention makes it possible for the bending loads to be shared without adding to the weight of the aircraft; that is, the overall weight of the aircraft equipped with non-load-carrying cowls. The load carrying core cowl may be constructed from various lightweight composite or metal materials that maintain their structural strength within the range of temperatures that can be maintained in an air cooled cowl. The structure of the apparatus of the present invention solves the problem of the tendency for the inner portions of reinforcing beams of the cowl to reach higher temperatures than the outer surface of the cowl. In the apparatus of the present invention, the reinforcing beams have a duel function, structural reinforcement and providing means for cooling. The beams also protect portions of the sidewall of the cowl from radiated engine heat.

It is anticipated that the application of the method and apparatus of the present invention will result in great savings in both maintenance costs and fuel costs associated with the operation of aircraft. The method and apparatus of the present invention have the additional advantage of being compatible with the use of the new composite materials. Therefore, as these composites are used more and more in the construction of different parts of the airplane, including the wings, the load carrying core cowl and method of the present invention will be entirely compatible with the new structures.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 1 is a sectional view of a portion of an airplane wing on which is mounted a jet engine and the preferred embodiment of the load carrying core cowl of the present invention, with some elements shown in plan.

FIG. 2 is a partially exploded pictorial view of the frame structure, engine, and cowl shown in FIG. 1.

FIG. 3 is an exploded pictorial view of the preferred embodiments of the cowl and cowl support structure.

FIG. 4 is a side elevational view of the preferred embodiment of the cowl and the cowl support shroud with foreground portions cut away to reveal portions of the engine casing and the internal structure of the core cowl.

FIG. 5 is a fragmentary pictorial view of the inner surface of the preferred embodiment of the cowl.

FIG. 6 shows the cross-sectional configuration of a commonly used wide flange support beam.

FIG. 7 is a cross-sectional view of one of the tubular beams that form a part of the preferred embodiment of the invention.

FIG. 8 is a pictorial view looking toward the inner surface of one-half, or one door, of the load carrying core cowl of the preferred embodiment.

FIG. 9 is a detail of the indicated portion of the cowl door shown in FIG. 8, illustrating a portion of the hinge mechanism.

FIG. 10 is a detail of another portion of FIG. 8, as indicated in the drawing.

FIG. 11 is a detail of the end of one of the axial beams and a portion of the forward V-tongue support structure of the preferred embodiment.

FIG. 12 is a fragmentary pictorial view showing portions of the aft support ring frame, the load transfer ring, and one of the swivel links that structurally integrate the cowl with the engine casing.

BEST MODE FOR CARRYING OUT THE INVENTION

The drawings show a load carrying core cowl 30 and connecting and mounting structures that are constructed according to the invention and that also constitute the best mode of the apparatus of the invention currently known to the applicants. FIG. 1 shows the core cowl 30 and its associated structures in a typical installation in association with a jet engine mounted on an aircraft wing 2. A number of conventional features are illustrated in FIG. 1. These features include the wing 2 of the aircraft, the frame member 4 extending from the wing 2 and on which the engine is mounted, the forward strut fairing 6, the fan 8, the exhaust plug 10, the nozzle exhaust sleeve 12, and the nose cap 14. Such features are all standard in jet engines and may be varied considerably without affecting the functioning of the structures that are a part of the apparatus of the present invention.

The load carrying core cowl 30 of the present invention is an essentially cylindrical structure that surrounds the core of the engine in the conventional manner. The outer surface of the sidewall 32 of the cowl 30 is positioned, also in a conventional manner, to be exposed to a cooling airstream. This airstream is normally provided by the flow of ambient air. The cowl 30 is made of a material that can withstand heat but that loses structural strength as its temperature rises above a predetermined level. The cowl 30 includes an essentially cylindrical sidewall 32 and stiffening means for stiffening the cowl 30. The stiffening means increases the structural strength of the cowl 30.

The stiffening means includes a plurality of hollow tubular beams 34 on the inner surface of the sidewall 32 of the cowl 30. These beams preferably extend axially along the inner surface of the sidewall 32 of the cowl 30 and are distributed circumferentially about this inner surface. In the preferred embodiment, these axial beams 34 are spaced circumferentially about the inner surface of the sidewall 32, and the stiffening means also includes a plurality of axially spaced circumferential beams 38 that extend circumferentially around the inner surface of the sidewall 32 of the cowl 30. Of course, the beams could also be arranged, without departing from the spirit and scope of the invention, in any of a variety of different patterns that provide the required stiffening. By way of nonlimitative example only, they could be arranged in a helical pattern.

Each of the circumferential and the axial reinforcing beams 34, 38 are tubular and have a wall portion 36 that is spaced from the inner surface of the sidewall 32 of the cowl 30. Preferably, the wall portion 36 of each of the beams 34, 38 is also essentially parallel to the inner surface of the sidewall 32. In the preferred embodiment shown in the drawings, each of the axial and circumferential beams 34, 38 is a hollow box beam. Each such box beam is rectangular in cross section with two side webs 35 extending radially inwardly from the sidewall 32 and a radially inward wall portion 36 that connects the radially inner ends of the two side webs 35. This radially inward wall 36 forms the wall portion that is essentially parallel to and spaced from the inner surface of the sidewall 32 of the cowl 30.

The sidewall 32 of the cowl 30, the two side webs 35, and the radially inward wall 36 that connects the webs 35 together define an essentially rectangular passageway 37, 39 through each of the beams 34, 38. The axial beams 34 and the circumferential beams 38 are interconnected when they cross each other in a manner in which the rectangular passageways 37, 39 through the beams are interconnected. This allows the passage of cooling air between the axial and the circumferential beams 34, 38.

Although the beams 34, 38 and the passageways 37, 39 in the preferred embodiment shown in the drawings are rectangular in cross section, beams and/or passageways with differently shaped cross sections could also be provided. By way of nonlimitive example only, the passageway cross sections might be circular, elliptical, or triangular.

The greatest part of the structural stiffening of the load carrying core cowl 30 is accomplished by the provision of the above described axial and circumferential beams 34, 38. In addition to these beams 34, 38, the panel portions of the sidewall 32 of the cowl 30 between the beams 34, 38 are given further reinforcement by the provision of doublers 33 or "annular" rectangular areas of double thickness.

The cowl 30 is preferably made of a lightweight composite material. Most currently known composite materials are not suitable for use in constructing the cowl 30 because they lose their structural strength when their temperatures rise to relatively low levels. However, certain newly available composite materials maintain their structural strength at higher temperatures. One such material is Graphite/PMR-15 Polyimide, developed by the National Aeronautics and Space Administration. This composite maintains its structural strength at temperatures in the range of 500 to 550 degrees F. and has an estimated useful life of 10,000 hours at 500 degrees F. Other lightweight composite materials that similarly maintain their structural strength at such temperatures could also be used to construct the cowl 30. In the preferred embodiment, the cowl 30 is made of laminate panels of such a composite material, and the axial and the circumferential beams 34, 38 are formed integrally with the sidewall 32 of the cowl 30. This construction has the advantages of maximizing both structural strength and lightness and of being relatively inexpensive to manufacture.

In operation, the flow of ambient air along the outer surface of the sidewall 32 of the cowl 30 is sufficient to maintain the temperature of the sidewall 32 at or below the 500 degree range. However, there is a tendency for portions of the axial and circumferential beams 34, 38 to heat to a temperature higher than the 500 degree range. This tendency is due to the greater proximity of the beams 34, 38 to the high engine temperatures and to the relative remoteness of the beams 34, 38 from the flow of ambient air that moves along the outer surface of the sidewall 32 of the cowl 30. Composite materials such as those used to construct the cowl 30 do not have sufficient thermal conductivity to allow the cooling of the outer surface of the sidewall 32 to provide sufficient cooling for the inner portions of the beams 34, 38. Therefore, it is necessary to provide means for cooling the two side webs 35 and, especially, the radially inward wall 36 of each beam 34, 38. This cooling is necessary because, although the composite used in making the cowl 30 maintain their structural strength in the 500 degree range, these composite begin to lose their structural strength at temperatures above this level.

The need for cooling is one of the reasons that the reinforcing beams, the axial and circumferential beams 34, 38, are provided in tubular form. The tubular form of the beams 34, 38 makes it possible to direct cooling air through the beams 34, 38 and through the interconnecting passageways 37, 39 formed by the beams 34, 38. FIG. 7 shows a cross section of one of the beams 34, 38. FIG. 6 shows a cross section of a well known wide flange beam configuration 99 that is used for structural reinforcement of surfaces. A composite beam with such a configuration could not be properly cooled and, therefore, would fail when its inner portion was subjected to high engine temperatures.

The flow path of cooling air through the beams 34, 38 is illustrated in FIG. 5. The flow is metered in order to maintain the inner portions 35, 36 of the beams 34, 38 at essentially the same temperature as the outer surface of the sidewall 32 of the cowl 30. When this is accomplished, each beam 34, 38 formed by two side webs 35, a radial inward wall 36, and a portion of the sidewall 32 of the cowl 30 properly functions as a structural beam to reinforce the strength of the cowl 30. With the radially inward wall 36 and the portion of the sidewall 30 having essentially equal strength, each is able to carry the compression or tension forces created in it by the tendency of the cowl 30 to bend. With each of these parts carrying its share of the load, the neutral plane (the plane between the compressed member and the tensioned member at which both compression and tension are zero) is maintained in its desired position substantially halfway between the radially inward wall 36 and the sidewall 30, and the beam 34, 38 functions efficiently as a structural reinforcement. The provision of the correct amount of flow of cooling air by metering the flow is important to the functioning of the cowl 30 because it maintains the compressed portion and the tensioned portion of the beam 34, 38 at essentially the same temperature level so that the strength of each of these portions is substantially equal.

The flow of cooling air through the beams 34, 38 may be provided in several ways. In the preferred embodiment shown in the drawings, the flow is provided by using forced aspiration to channel ambient air through the passageways 37, 39 formed by the beams 34, 38. In order to obtain the forced aspiration, inlet means are provided at the forward end of the cowl 30, and outlet means are provided at the rear end of the cowl 30. In the preferred embodiment, a suitable inlet 40 is located at the forward end of each axial beam 34, and a suitable outlet 42 is located at the rear end of each axial beam 34. These inlets 40 and outlets 42 are positioned in a known manner to take advantage of the relative velocity between the air inlet 40 and the air stream flowing past the cowl 30 and to minimize drag. As shown in the drawings, the inlet 40 is formed flush with the outer surface of the cowl 30 and angled slightly forward. Similarly, the outlet 42 is formed flush with the outer surface of the cowl 30 and is angled slightly to the rear of the cowl 30. The flow of cooling air is aspirated through the passageways 37, 39.

Of course, the flow of cooling air could be provided in other ways. One such way is to induce the flow of air by producing a suction effect through the passageways 37, 39 in the beams 34, 38 by injecting a flow of gases past an outlet opening in the passageways. Flow of cooling air may also be provided by supplying bleed air from the compressor in the engine.

In the preferred embodiment, the metering of the flow of cooling air is automatically provided by the structure of the beams 34, 38 and the inlet and outlet openings 40, 42. The sizes of the beams 34, 38 and the passageways 37, 39 extending through them are carefully selected to permit the desired amount of flow through them. In addition, the sizes and positions of the inlets 40 and outlets 42 are selected to create forced aspiration of the proper magnitude to maintain the desired amount of flow of cooling air.

As is standard in many known jet aircraft, the jet engine shown in FIG. 1 is connected to the frame member 4 carried by the wing 2. The engine fan casing 18A is connected to the frame 4 at a forward location 15, and an aft portion of the engine core casing 18B is connected to the frame 4 at an aft location 16. The fan casing 18A is connected to a forward portion of the core casing 18B through a series of radial struts 19. In this arrangement with the engine core casing 18B supported near each of its ends, the engine core casing 18B acts as a beam and carries the bending loads caused by the thrust and by the air loads acting on the aircraft. In known aircraft, the engine casing carries all of the bending loads. With the development of larger aircraft with larger engines of lighter weight construction, the bending loads on the engine casing have increased to a magnitude sufficient to cause serious performance deterioration of the engine.

A possible solution to the engine bending problem would be to stiffen the engine to give it greater structural strength. However, such a solution would cost a great deal more than the alternative of structurally integrating the cowl with the engine and would add to the overall weight of the aircraft. Therefore, in aircraft incorporating the apparatus of the present invention, connecting means are provided for connecting the core cowl to the engine mounting frame and for structurally integrating the engine casing with the core cowl. With the core cowl and the engine structurally integrated, the core cowl, like the engine, acts as a beam which is subject to bending during engine operation. Thus, the core cowl shares bending loads with the engine. This division of bending loads between concentric beams allows the engine to carry its share of the loads without experiencing undesirable performance deterioration.

The preferred embodiment of the structural integration of the engine core casing 18B with the core cowl 30 has various aspects. (See FIGS. 3 and 12) One such aspect is that the forward attachments to the engine core casing 18B, via the cowl support shroud 20, have been increased over the conventional attachments to be load-bearing. A V-groove is provided on the aft end of the shroud 20, and a complementary V-tongue 24 is provided at the forward edges of the cowl doors 31 that form the essentially cylindrical cowl 30. A forward cowl door tensioner 26 on the ladder cowl support structure 22 of the engine core casing 18B provides hoop tension to make the connection load-bearing. An automatically operated hoop tensioning device is provided. This device is only in operation when the engine is running so that it will not interfere with maintenance accessibility. At the rear of the cowl doors 31, there is located a support ring frame 27. This support ring frame 27 receives a load transfer ring 29 which is carried by the engine core casing 18B and which transmits reactions evenly to the rear of the casing 18B. An aft cowl door tensioner 28 is provided on the ladder support structure 22 in association with this ring 29. The load transfer ring 29 preferably includes swivel links 29A (See FIG. 12) which allow for thermal expansion of the engine under all loading conditions. Hinges 50, such as the one shown in FIG. 9, are provided along the axial edges of the cowl doors 31 to allow pivoting of the doors 31 when they are opened. Latches 52 are provided to secure the two cowl doors 31 together, with each of the cowl doors 31 forming one-half of the essentially cylindrical cowl 30.

The load-bearing connections between the cowl 30 and the engine casing at the forward end of the cowl (through the intermediate shroud 20) and the aft end of the cowl 30 (through the load transfer ring 29) structurally integrate the cowl 30 with the engine casing. This results in the desired load sharing between the engine casing and the cowl 30. Each of the cowl 30 and the engine casing acts as a beam that carries a share of the bending loads.

Static load tests have been conducted to test the load sharing concept that is an aspect of the present invention. Simulated thrust loads and cowl bending moments were applied to apparatus constructed according to the invention. The results of the tests were overwhelmingly favorable. Sixty percent load sharing was achieved in the turbine section, and over forty percent load sharing in the fan section. The stiffening effect in the fan case will be extremely helpful in solving the problem of instability in the fan. The test results indicated that over 75% of the deterioration in the thrust-specific fuel consumption of the aircraft due to backbone bending of the engine can be prevented by use of a load carrying core cowl. In addition, the engine casing offset can be reduced, producing a gain in the initial thrust-specific fuel consumption.

In summary, the apparatus and method of the present invention greatly reduce engine performance deterioration, and therefore greatly reduce maintenance costs and loss of fuel efficiency. With the use of the new composite materials, the benefits of the reduction in performance deterioration can be obtained with little or no weight penalty being incurred.

Although the best mode and preferred embodiment of the invention has been illustrated and described herein, it is intended to be realized by those skilled in the art that the present invention may be embodied in other than the specific apparatus, method, and applications illustrated and described herein. Various changes may be made without departing from the spirit and scope of the present invention as defined in the following claims.

We claim:

1. In combination with an aircraft wherein an engine having a casing is carried by an engine mounting frame and wherein the engine casing acts as a beam, the improvement which comprises:
   a core cowl surrounding a portion of the engine; said cowl comprising a material that can withstand heat but that loses strength as its temperature rises above a predetermined level; and said cowl including a sidewall the outer surface of which is positioned to be exposed to a cooling airstream, and stiffening means for stiffening the cowl, said stiffening means including a plurality of tubular beams on the inner surface of the sidewall of the cowl, each of said beams having a wall portion that is spaced from said inner surface;
   connecting means for connecting the cowl to said engine mounting frame and for structurally integrating the engine casing with the cowl; and
   means for directing cooling air through said beams;
   wherein the cowl acts as a beam and shares bending loads with the engine casing.

2. The combination recited in claim 1, wherein said tubular beams include a first set of non-intersecting beams that are spaced about said inner surface, and a second set of non-intersecting beams that are spaced about said inner surface, said first set of beams intersecting said second set, and said first and second sets of beams being interconnected to allow the passage of cooling air between them.

3. The combination recited in claim 1 or claim 2, wherein said wall portion is essentially parallel to said inner surface.

4. The combination recited in claim 3, wherein said tubular beams are hollow box beams.

5. The combination recited in claim 1, wherein said tubular beams extend axially along and are distributed circumferentially about said inner surface.

6. The combination recited in claim 5, wherein said axial beams are spaced circumferentially about the inner surface of the sidewall of the cowl; and the stiffening means further includes a plurality of axially-spaced tubular beams extending circumferentially around the inner surface of said sidewall, each of said circumferential beams having a wall portion that is spaced from said inner surface; said axial beams and said circumferential beams being interconnected to allow the passage of cooling air between them.

7. The combination recited in claim 6, wherein said wall portion of each axial beam and said wall portion of each circumferential beam are essentially parallel to said inner surface.

8. The combination recited in claim 7, wherein said axial beams and said circumferential beams are hollow box beams.

9. The combination recited in claim 1, wherein the means for directing cooling air comprises inlet means at the forward end of the cowl, and outlet means at the rear end of the cowl, said inlet means and said outlet means being positioned to maintain flow of cooling air by forced aspiration.

10. The combination recited in claim 5 or claim 6, wherein the means for directing cooling air comprises inlet means at the forward end of each axial beam, and outlet means at the rear end of each axial beam, said inlet means and said outlet means being positioned to maintain flow of cooling air by forced aspiration.

11. The combination recited in claim 1, wherein the cowl comprises laminate panels of composite material, and the tubular beams are formed integrally with the sidewall of the cowl.

12. In a system in which an engine is carried by an engine mounting frame of an aircraft, a core cowl surrounds a portion of said engine, the outer surface of the sidewall of the cowl is exposed to a cooling airstream, and the engine casing acts as a beam that carries bending loads, a method of minimizing engine backbone bending, said method comprising:

providing the core cowl with tubular beams on the inner surface of the sidewall of the cowl to stiffen the cowl;

connecting the cowl and the engine casing together and structurally integrating the engine casing with the cowl to allow the cowl to act as a beam so that the cowl and the engine casing each experience bending loads; and directing a metered flow of cooling air through the tubular beams to maintain the radially inner portions of the beams at essentially the same temperature as the outer surface of the sidewall of the cowl.

13. A method as recited in claim 12, wherein the step of directing a metered flow comprises:

selecting tubular beams with longitudinal passageways that are sized to permit the desired amount of flow; and positioning inlet means at the forward end of the cowl and outlet means at the rear end of the cowl to maintain flow of cooling air by forced aspiration.

* * * * *